United States Patent [19]

St. John

[11] 4,282,962
[45] Aug. 11, 1981

[54] PIVOTAL MOUNTING ASSEMBLY

[75] Inventor: Richard C. St. John, North Canton, Ohio

[73] Assignee: Aspro, Inc., Canton, Ohio

[21] Appl. No.: 957,141

[22] Filed: Nov. 2, 1978

[51] Int. Cl.³ .......................................... F16D 43/18
[52] U.S. Cl. ...................... 192/105 CD; 188/205 A; 192/30 V; 192/110 B
[58] Field of Search .................. 308/2 R, 184 R, 239; 188/184, 205 A; 192/105 CD, 105 CE, 105 CF, 103 B, 110 B, 30 V; 16/136

[56] References Cited

U.S. PATENT DOCUMENTS

| | | | |
|---|---|---|---|
| 2,375,909 | 5/1945 | Fawick | 192/105 CD |
| 2,534,426 | 12/1950 | Eason | 192/105 CE |
| 2,606,947 | 8/1952 | Happe | 308/184 R X |
| 2,626,034 | 1/1953 | Fawick | 192/105 CD |
| 2,829,754 | 4/1958 | Norcross | 188/184 X |
| 2,968,829 | 1/1961 | Meddick | 16/136 |
| 3,622,112 | 11/1971 | Stroh | 248/181 |
| 4,036,540 | 7/1977 | Seufert | 308/239 |
| 4,192,412 | 3/1980 | Stoner | 192/105 CD |

FOREIGN PATENT DOCUMENTS

| | | | |
|---|---|---|---|
| 637609 | 5/1928 | France | 192/105 CD |
| 671010 | 4/1952 | United Kingdom | 308/239 |
| 730367 | 5/1955 | United Kingdom | 192/105 CD |
| 933615 | 8/1963 | United Kingdom | 192/105 CD |
| 940562 | 10/1963 | United Kingdom | 192/105 CD |

*Primary Examiner*—Rodney H. Bonck
*Attorney, Agent, or Firm*—Frease & Bishop

[57] ABSTRACT

An improved pivotal mounting assembly, preferably for use with a centrifugal clutch for pivotally mounting the clutch shoes, has a plastic insert which forms either a sector-like portion of a usual cylindrical-shaped, metallic pivot pin, or a portion of the clutch shoe which forms a pivot pin receiving opening. The plastic insert will have an outer convex surface when forming a part of a cylindrical pivot pin or will have a concave surface when forming a part of the clutch shoe. Preferably the convex and concave surfaces will have arcuate lengths of approximately 120°. The plastic insert provides a low-friction pivotal bearing surface for the clutch shoe, which will absorb many of the forces and stresses exerted on the pivot assembly upon coupling engagement of the clutch shoes with a driven drum. The supporting metal areas of the pivot pin or clutch shoe adjacent the plastic strip provides the mechanical strength for the strip.

9 Claims, 13 Drawing Figures

PIVOTAL MOUNTING ASSEMBLY

BACKGROUND OF THE INVENTION

1. Field of the Invention

The invention relates to pivotal connections, and in particular to a pivotal mounting assembly which provides both a smooth, low-friction, sliding and shock-absorbing connection between a pair of movable members. More particularly, the invention relates to an improved pivotal mounting assembly primarily for use with the shoes of a centrifugal clutch.

2. Description of the Prior Art

There are numerous types and arrangements of pivot connections or pivotal mounting assemblies for a pair of members, one of which is adapted to swing or pivot with respect to the other member. One common type of pivot assembly consists of a cylindrical pivot pin or projection which is telescopically mounted on or engaged within a complementary-shaped opening formed in the other member. These pivot pins, depending upon the particular assembly in which they are used, are either formed of metal when relatively large forces and stresses are exerted thereon, or they may be formed of plastic or similar synthetic materials when the exerted forces are relatively small.

Clutches, brakes, and similar types of equipment have one or more members, referred to as "shoes", which are pivotally mounted on a supporting member which is either fixed or rotatable with respect to the specific type of equipment with which it is to be used. These shoes pivot outwardly when acted upon by some means to couplingly engage an outer member or housing so that the members will rotate in unison, as in a clutch construction, or will stop further rotation of the members, as in a brake assembly. The shoes, and in particular, the pivotal mounting assembly therefor, will experience relatively large forces and stresses or a plurality of vibrational stresses upon and during coupling engagement with the outer member. Unless the pivotal mounting assembly is formed of sufficiently rigid materials, failure will ultimately result requiring replacement or undesirable maintenance.

It is desirable that the pivotal mounting arrangement for many of these shoes be provided with some type of shock-absorbing feature or component which assists in lessening the coupling forces and stresses exerted on the shoes and pivot pins. Various types of resilient bushing arrangement have been used for mounting of brake and clutch shoes. One particular type of assembly consists of a cylinder or annulus of an elastomer or synthetic material which is telescopically mounted on and surrounds a metal pivot pin with the shoe being pivotally mounted thereon. This intervening annulus or layer of shock-absorbing material absorbs many of the forces and stresses exerted on the inner metal pin and adjacent shoe areas. These types of cushioned pivotal mounting arrangements have the disadvantage of increasing the outer diameter of the pivot pin since the inner metallic pin is completely surrounded by the annulus of resilient material. The inner steel pin is required for strength of the pivot with the outer resilient layer providing the shock-absorbing effect, and in some assemblies a low-friction sliding surface.

Such assemblies have the further disadvantage of requiring greater thicknesses of shock-absorbing material than may be desirable in order to withstand the stresses which are exerted thereon since the exerted forces compress the affected areas of the resilient layer toward the inner steel pin. The adjacent areas are forced or bulged outwardly since they are unrestrained. This can result in rupture or cracking of the adjacent areas of resilient material. Also, it is difficult to prevent the resilient annulus from turning on the inner fixed metal pin, which results in high wear rates.

These known types of shock-absorbing pivotal mounting assemblies can be properly designed to, and in many constructions do, provide satisfactory results. However, such assemblies require larger components than desirable, and space is at a premium in most clutch and brake constructions and similar types of equipment.

Therefore, the need has existed for an improved pivotal mounting assembly intended primarily for use in clutches, brakes and similar equipment, for the mounting of shoes therein which will absorb the various impact forces and stresses exerted on the pivot assembly which are experienced when the shoes couplingly engage an outer member, and which will provide a smooth, reduced friction sliding surface for the pivotal movement of the shoes.

No assembly of which I am aware achieves these results by using an insert strip preferably formed of a high strength plastic material in combination with the surrounding metal to provide the required strength as well as shock-absorbing ability for the pivot assembly.

SUMMARY OF THE INVENTION

Objectives of the invention include providing a pivotal mounting assembly having an insert strip formed of a plastic material which forms either a portion of a generally cylindrical-shaped metal pivot pin, or forms a portion of the area which defines a pivot pin receiving opening in a pivotally mounted member which is formed of metal, whereby the plastic insert provides both the low-friction sliding surface and provides a shock-absorber for the coupling impact forces, with the adjacent metal areas providing the required strength for either the pivot pin or pivotally mounted member; providing such an assembly in which a metal pivot pin is formed with a V-shaped groove extending throughout the longitudinal length of the pin, and in which the plastic insert has a configuration complementary in size and shape to the groove; providing such an assembly in which the pivotally mounted member is formed with a recess adjacent the pivot pin receiving opening, with the plastic insert having a curved concave outer surface being seated within the recess, which forms in combination with the adjacent curved metal edges of the surrounding metal member, a pivot pin receiving opening; providing such an assembly in which the plastic insert is in biaxial or triaxial compression since the sides and ends of the plastic insert are confined by surrounding areas of metal to enable the insert to absorb large amounts of stress without failure; providing such an assembly in which the plastic insert does not increase the outside diameter of the pivot pin or the diameter of the pivot pin receiving opening in a pivotally mounted member, while providing a shock-absorbing and smooth, low-friction sliding surface; providing such an assembly which is intended primarily for pivotally mounting shoes of clutch and brake constructions, although it need not be limited to such applications; providing such an assembly which does not appreciably increase the cost of the particular clutch or brake assembly with which it is used, and which requires relatively few changes in existing clutch and brake components; and provides such a pivotal mounting assembly which is of a relatively simple arrangement, easy to manufacture and assemble, sturdy and durable in use, which eliminates difficulties encountered with other pivotal connections, which can be modified to provide various operating characteristics and design criteria, which achieves the objectives indicated, and which solves problems and statisfies needs existing in the art.

These objectives and advantages are obtained by the improved pivotal mounting assembly, the general nature of which may be stated as including a first member; pin means mounted on the first member, said pin means having a convexly curved outer surface; a second member; opening means formed in the second member, said opening means being partially defined by a concavely curved surface; the pin means being telescopically mounted within the opening means to pivotally mount the first and second members with respect to each other; and a strip of plastic material forming either a portion of the convexly curved outer surface of the pin means or a portion of the concavely curved surface of the second member to provide a low-friction, shock-absorbing pivotal bearing surface between the first and second members.

BRIEF DESCRIPTION OF THE DRAWINGS

Preferred embodiments of the invention—illustrative of the best modes in which applicant has contemplated applying the principles—are set forth in the following description and shown in the accompanying drawings, and are particularly and distinctly pointed out and set forth in the appended claims.

Similar numerals refer to similar parts throughout the drawings.

DESCRIPTION OF THE PREFERRED EMBODIMENTS

First Embodiment

Figure 1:
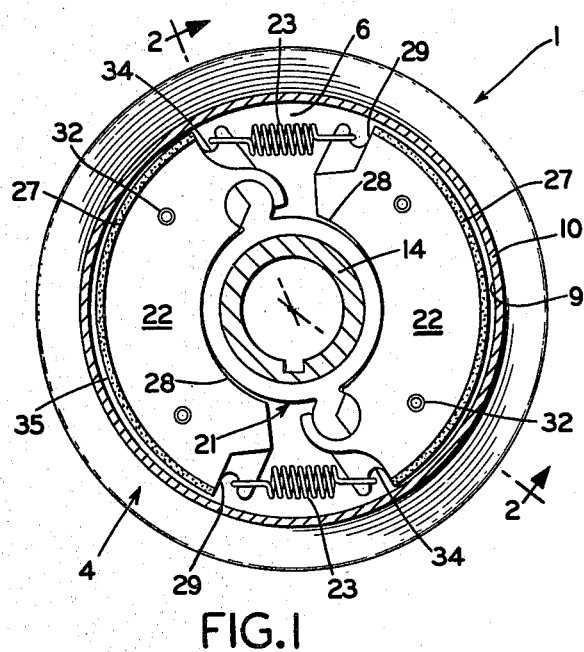
FIG. 1 is a plan view of a clutch construction with the improved pivotal mounting assembly incorporated therein, with the clutch housing and hub shown in section and the clutch shoes in disengaged position.

One form of the improved pivotal mounting assembly is shown in FIGS. 1-6 incorporated within an improved clutch construction, indicated generally at 1. Clutch 1 is shown mounted on a power drive shaft 2 and includes a rotor assembly 3 and a driven pulley-clutch housing assembly 4. Clutch 1 is shown in disengaged position in FIGS. 1, 2, and 3.

Assembly 4 is shown as a pulley-clutch housing combination having a V-groove pulley member 5 which is connected to a hub flange wall 6 of a cup-shaped housing 7 by an annular spacing ring 8. Inner cylindrical surface 9 of housing wall 10 provides the coupling surface for drivingly connecting pulley-housing assembly 4 with rotor assembly 3. Housing 7 and pulley 5 may have various configurations and arrangements than that shown in the drawings and may be adapted to be operatively engaged with mechanisms other than a V-groove pulley belt (not shown) without departing from the concept of the invention.

Figure 2:
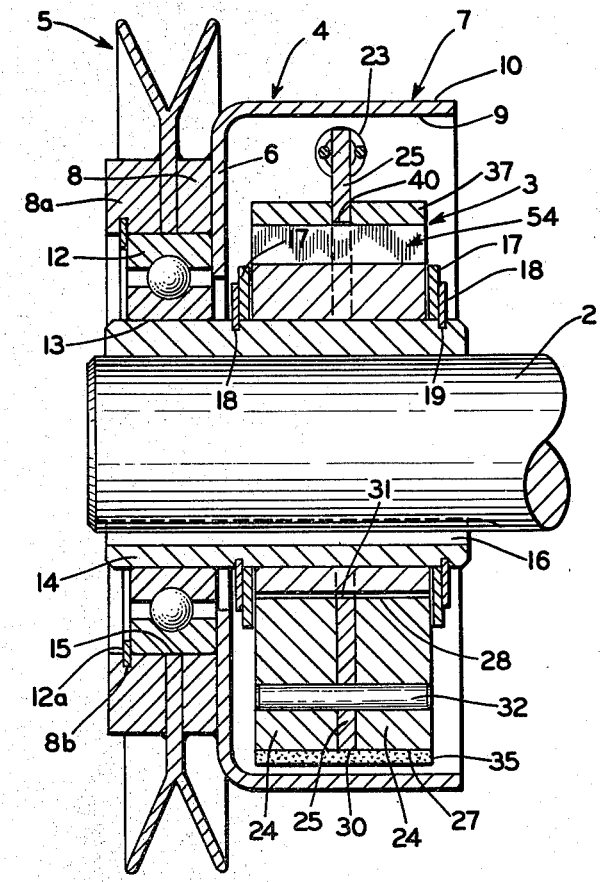
FIG. 2 is an enlarged sectional view taken on line 2—2, FIG. 1, with the clutch shown mounted on a drive shaft.
Figure 4:
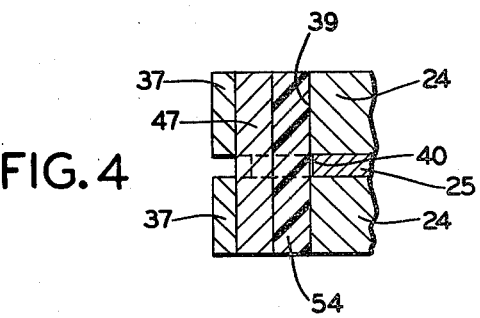
FIG. 4 is an enlarged fragmentary sectional view taken on line 4—4, FIG. 3.
Figure 5:
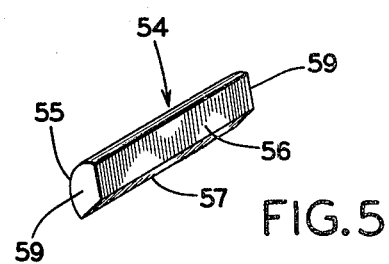
FIG. 5 is a perspective view of the plastic insert strip of the improved pivotal mounting assembly.
Figure 6:
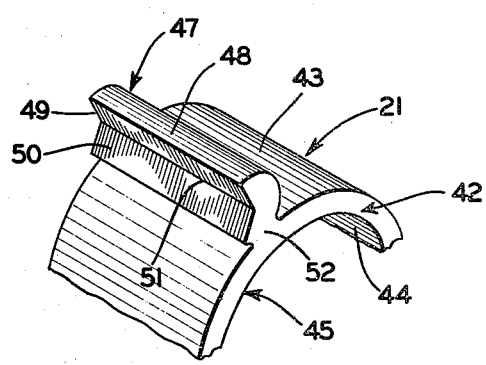
FIG. 6 is a fragmentary perspective view of a modified clutch hub pivot collar with a portion of the improved pivotal mounting assembly formed thereon.
Figure 9:
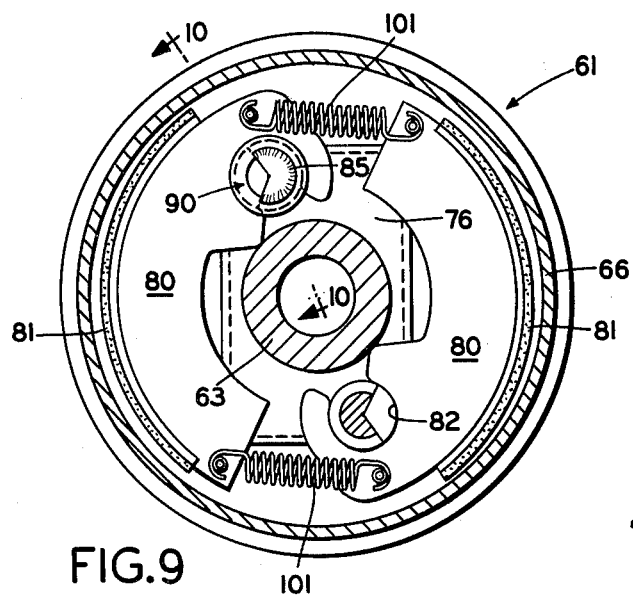
FIG. 9 is a plan view, similar to FIG. 1, of another type of clutch construction with a modified form of the improved pivotal mounting assembly incorporated therein.

A bearing ring 12 is telescopically mounted on the outer surface 13 of a cylindrical hub 14 and concentrically within a central mounting opening 15 formed in pulley 5. A second annular spacing ring 8a is mounted on the outer end of bearing ring 12 and may be welded to pulley 5, and provides a seat 8b for receiving a snap ring 12a. Bearing ring 12 enables hub 14 and rotor assembly 3, which is fixedly mounted on hub 14, to rotate freely with respect to pulley-clutch housing assembly 4 until coupling engagement is achieved between rotor assembly 3 and housing surface 9. Hub 14 is mounted on and secured to drive shaft 2 by a press fit, or by a keyway arrangement 16, as shown in FIG. 2.

Rotor assembly 3 is of the general type shown in my copending application Ser. No. 928,850, filed July 28, 1978. Rotor assembly 3 includes a pivot collar 21, a pair of clutch shoe assemblies 22 which are pivotally mounted on collar 21, and a pair of retaining springs 23. Collar 21 is telescopically mounted on hub 14 within wall 10 of housing 7 with a force fit so as to rotate with hub 14. Collar 21 is located between a pair of annular side plates 17 which are held in position adjacent rotor assembly 3 by snap rings 18. Rings 18 are seated within a pair of circumferential grooves 19 formed in and extending about surface 13 of hub 14.

Each shoe assembly 22 includes a pair of similar half shoe sections 24 with a spacer member 25 being sandwiched therebetween. Shoe sections 24 each have a generally arcuate configuration with a smooth, convexly shaped outer surface 27 and a complementary concavely shaped inner surface 28. The outer swinging end of each shoe section is formed with a stepped edge 29.

Spacer 25 has an arcuate configuration similar in size and shape to shoe sections 24. Spacer 25 includes a convex outer surface 30 and a concave inner surface 31, which are in axial alignment with outer convex surfaces 27 and inner concave surfaces 28 of shoe sections 24 when spacer 25 is mounted therebetween. Shoe sections 24 and spacer 25 are joined together by a pair of pins 32 or other fastening means. The ends of spacer 25 are formed with U-shaped recesses 34 into which springs 23 are attached to bias shoe assemblies 22 toward retracted position.

An arcuate-shaped strip of friction material 35 is mounted on and extends between outer convex surfaces 27 and 30 of shoe sections 24 and spacer 25 to provide a coupling surface which engages inner drum wall surface 9 for coupling engagement between drive rotor assembly 3 and driven pulley-clutch housing assembly 4.

A curved, hook-like formation 37 (FIG. 3) is formed on one end of each shoe section 24 opposite stepped edge 29 to form discontinuous openings 38 at the end of each shoe section. Openings 38 are defined by concavely shaped, generally cylindrical surfaces 39. A concavely shaped surface 40 also is formed in one end of spacer 25 similar to shoe surfaces 39 so as to conform generally therewith when sandwiched between the shoe sections.

In accordance with the invention, pivot collar 21 (FIG. 6) includes a cylindrical-shaped sleeve 42 having a cylindrical outer surface 43 and a concentric inner surface 44 which forms an interior bore 45. A pair of projections, indicated generally at 47, are formed integrally with sleeve 42 and are located diagonally opposite of each other on outer surface 43. Projections 47 extend longitudinally along sleeve 42, parallel to each other and to the longitudinal axis of sleeve 42. Projections 47 are formed of metal and preferably are joined by a base 52 integrally with sleeve 42 by sintering, casting, machining, or similar procedures. If desired, projections 47 may be separate components which are attached to sleeve 42 by welding, brazing, etc. without affecting the concept of the invention.

Projections 47 are identical to each other and include a convexly curved outer surface 48 and a pair of inwardly extending converging surfaces 49 and 50 which form a V-shaped groove 51 therebetween. In essence, projections 47 each have a generally cylindrical configuration with a portion removed therefrom. This removed portion resembles in cross-section a sector of a circle and has an arcuate length less than 180°, preferably a length of approximately 120°, as shown in the drawings.

In accordance with the invention, a strip of plastic material, indicated generally at 54 (FIG. 5), is mounted within V-shaped groove 51 of each pivot collar projection 47. Strip 54 has a configuration and size complementary to that of V-groove 51. Strip 54 includes a convexly curved outer surface 55 and a pair of converging smooth side surfaces 56 and 57. Strip 54 is formed of a high strength plastic, such as a diallylphthalate, polycarbonate, polysulfone, or other appropriate material. Various other types of engineering plastic materials may be used in forming strip 54 without affecting the concept of the invention. Strip 54 also can be formed of powdered metal and other bearing metals for certain applications.

Figure 3:
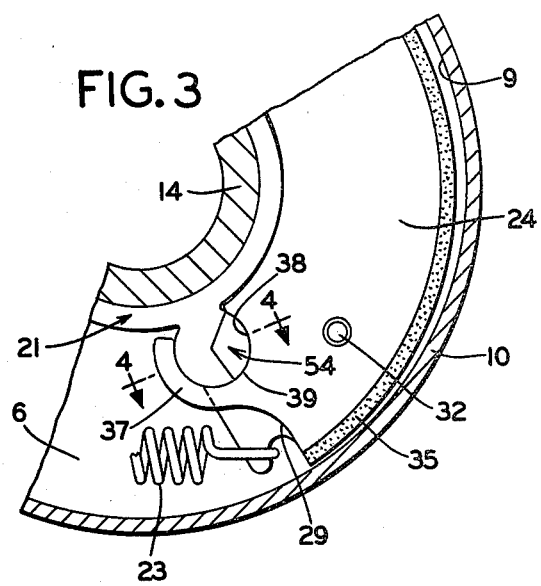
FIG. 3 is an enlarged fragmentary view of the pivotal mounting assembly for one of the clutch shoes.

Strip 54 may be bonded by an adhesive within V-groove 51 or may be slip fitted therein when shoe assemblies 22 are pivotally mounted on projections 47, as shown in FIGS. 1 and 3. Outer strip surface 55 has a radius of curvature equal to that of concave inner surfaces of shoe sections 24 and surface 31 of spacer 25, and equal to convex surface 48 of projection 47.

In assembled condition shoe assemblies 22 are pivotally mounted on collar 21 by telescopic engagement with sleeve projections 47, which include insert strips 54, within discontinuous shoe openings 38. Springs 23 bias the pivotally mounted shoe assemblies 22 toward the retracted position of FIGS. 1-3. The concaved inner surfaces 28 and 31 of shoe sections 24 and spacers 25 abut outer surfaces 43 of cylindrical sleeve 42 when in retracted, unactuated position, preventing further inward movement of the shoe assemblies.

The general operation of clutch 1 is similar to many centrifugally actuated clutch constructions. Shoe assemblies 22 attempt to pivot radially outwardly from their retracted positions under the influence of centrifugal force as the rotational speed of shaft 2 increases. The predetermined resistance of springs 23 retains the shoes in disengaged position until shaft 2 reaches a predetermined engagement speed. When approaching the engagement speed, the shoe assemblies move outwardly, pivoting about the pivot pin assemblies formed by cylindrical projections 47 and insert strips 54 until friction material strips 35 drivingly engage drum wall surface 9. This coupling engagement rotates pulley-clutch housing assembly 4 to operatively drive a pulley V-belt (not shown) extending about and seated within the V-groove of pulley 5. The engagement speed of the clutch is dependent upon a number of known and determinable factors, such as the weight of shoe assemblies 22, the load rate of springs 23, the location of the pivot pin assemblies, etc.

In accordance with one of the main features of the invention, the various force and stresses which are exerted on the clutch shoes and transmitted to the pivot pins upon and during engagement of the shoes with the clutch housing are primarily exerted on and absorbed by plastic insert strips 54. The characteristics of the plastic material from which strips 54 are formed enable the strips to absorb many of these forces and stesses than if the pivot pins were formed entirely of metal. In essence, strip 54 functions as a shock-absorber for the clutch shoe pivot pins. Furthermore, convex outer surface 55 of strip 54 provides a low-friction surface which slidably engages concave inner surfaces 28 and 31 of the shoe assemblies. This provides a smoother pivotal motion than is achieved with an all metal pivot pin or cylindrical projection.

The arcuate length of convex strip surface 55 preferably is approximately 120°, although it can vary considerably and yet still provide the desired shock-absorbing and low-friction features. Limiting surface 55 to an arcuate length of approximately 120° has the advantage of confining strip sides 56 and 57 within the confines of V-shaped groove 51 formed by surfaces 49 and 50, which are in abutting relationship therewith. With this arrangement the coupling forces and stresses which are exerted on outer strip surface 55 are transmitted throughout strip 54 and against projection surfaces 49 and 50. Surfaces 49 and 50 prevent the plastic material from deforming or bulging outwardly as in prior art constructions as occurs when an unrestrained cylindrical-shaped plastic bushing is telescopically mounted on and surrounds a pivot pin. These restraining surfaces place the plastic strip in biaxial compression when absorbing the coupling forces and stresses. By restraining the ends 59 of strip 54 from any outward movement by side plates 17, the strip material is placed in triaxial compression.

Another important feature of the improved pivotal mounting assembly, which is shown particularly in FIGS. 1 and 3, is obtaining the shock-absorbing and low-friction advantages without increasing the outer diameter of the pivot assembly, as in prior constructions which use shock-absorbing bushings.

Thus, plastic insert strip 54, which is slidably engaged with a portion of the concave inner shoe surface which defines the pivot pin receiving opening, provides a shock-absorbing, low-friction sliding surface therewith, with pivot collar projection 47 which is formed of metal, providing the required strength for the pivot assembly.

Second Embodiment

A modified form of the invention is shown in FIGS. 9-12, mounted within an improved centrifugal clutch, indicated generally at 61. Clutch 61 is of the general type as shown in my copending application, Ser. No. 907,925, filed May 22, 1978 and now U.S. Pat. No. 4,226,320. Clutch 61 includes a rotor assembly 62 (a portion of which is shown particularly in FIG. 10), which is mounted on a hub 63 so as to rotate therewith. Hub 63 is adapted to be mounted on a drive shaft (not shown) which is similar to drive shaft 2 of FIG. 2. Clutch 61 further includes a driven clutch member 64 which is shown as a pulley-clutch housing having a multi-V-groove pulley end formation 65 and an integrally connected cylindrical housing drum wall 66.

Figure 10:
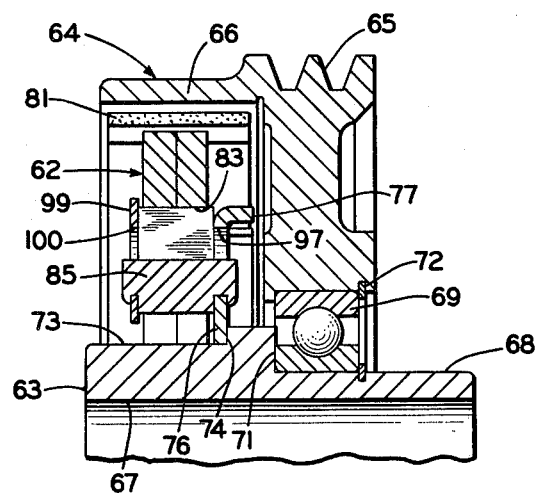
FIG. 10 is an enlarged fragmentary, sectional view taken on line 10—10, FIG. 9.

Hub 63 has a smooth cylindrical bore 67 in which a drive shaft is telescopically mounted, and includes a reduced diameter cylindrical outer end surface 68 on which driven clutch member 64 is rotatably mounted by a bearing ring 69 (FIG. 10). Bearing ring 69 is located between an annular shoulder 71 formed on hub 63 and a snap ring 72 which maintains bearing ring 69 in a position against shoulder 71.

The other end of hub 63 is provided with a larger outer cylindrical surface 73 which terminates in an annular shoulder 74 which extends radially with respect to the central axis of rotor assembly 62 and parallel with annular shoulder 71.

A rectangular-shaped drive flange 76 is securely mounted on hub surface 73 against shoulder 74 by circular welds or brazed areas. Drive flange 76 is formed with out-turned stiffening marginal flanges 77.

Figure 11:
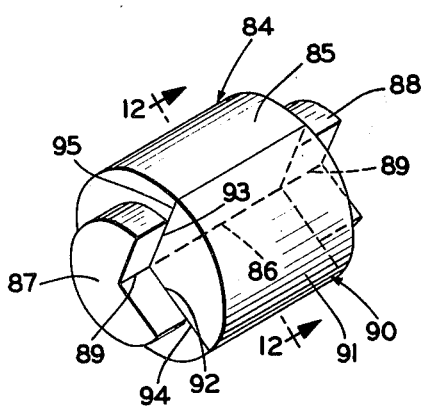
FIG. 11 is an enlarged perspective view of the improved pivotal mounting assembly which is mounted in the clutch construction of FIGS. 9 and 10.

A pair of arcuate-shaped clutch shoes 80 having frictional outer surfaces 81 are pivotally mounted on drive flange 76 by the improved pivotal mounting assembly, indicated generally at 84, and shown particularly in FIG. 11. Each clutch shoe 80 is formed with a generally circular-shaped pivot pin receiving opening 82 adjacent one end thereof for pivotally mounting the shoes on a pair of the improved pivot pin assemblies.

Each pivot pin assembly 84 includes an cylindrically shaped main body 85 formed of steel or other metallic material, and has a longitudinally extending V-shaped groove 86 formed therein. Groove 86 is similar to a sector of a circle when viewed in cross-section. A pair of mounting projections 87 and 88 may be formed integrally with the ends of main cylindrical body 85 for mounting assembly 84 on drive flange 76. Projections 87 and 88 also are formed with V-shaped grooves 89 which are axially aligned with main body groove 86. A plastic insert strip 90, similar to strip 54, is mounted within V-shaped groove 86 to form a cylinder having a smooth, continuous, cylindrical outer surface. Insert strip 90 is similar to strip 54 in that it includes an outer convex surface 91 having the same radius of curvature as that of main body 85, and also has a pair of converging sides 92 and 93, which coincide with and abut against the V-groove forming walls 94 and 95 of V-shaped groove 86, when mounted therein.

Pivot pin assemblies 84 are mounted on drive flange 76 and extend outwardly therefrom in a cantilever-type manner. Pin mounting projections 88 extend through complementary-shaped openings 97 (FIG. 10) formed in drive flange 76 with the adjacent end surfaces of main body 85 and insert strip 90 abutting flange 76. Projections 88 are secured in flange openings 97 by welding, staking, peening or similar attachment means. The V-groove forming edges of projections 88 in combination with the similar V-shape forming edges of openings 97 prevent rotation of pivot assembly 84 with respect to flange 76.

The generally circular concavely shaped edges 83 of clutch shoes 80 which define pivot pin receiving openings 82 are slidably engaged with the outer cylindrical surfaces of cylindrical bodies 85 and insert strips 90. A circular end plate 99 preferably is mounted on the extended end of each bushing assembly 84 by telescopic engagement of end projections 87 through similar shaped openings 100 formed in end plates 99. A pair of springs 101, similar to springs 23, extend between adjacent ends of clutch shoes 80 to bias the swinging ends of the clutch shoes toward retracted position.

The operation of improved clutch 61 is similar to that described above with respect to clutch 1, with clutch shoes 80 being pivotally, slidably mounted on the low-friction, convex outer surface 91 of insert strip 90. Outer convex surface 91, has an arcuate length of approximately 120° and achieves the same advantages discussed above with respect to insert strip 54 when in combination with metallic reinforcing cylindrical body portion 85 of pivot pin assembly 84.

Third Embodiment

Figure 13:
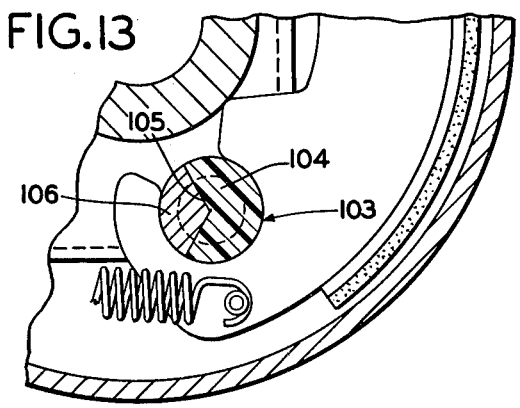
FIG. 13 is an enlarged fragmentary view, portions of which are in section, similar to FIGS. 3 and 7, showing a further modified form of the improved pivotal mounting assembly.

FIG. 13 broadly shows another modified form of the improved pivot pin assembly, indicated generally at 103. Assembly 103 is similar to assembly 84 described above, except that the outer convex surface of plastic insert strip 104 has an arcuate length of approximately 240°. Strip 104 is formed with a V-shaped groove 105 in which is bonded a V-shaped metallic pivot pin 106 which in cross-section resembles a sector of a circle.

The construction of FIG. 13 provides some of the features as that described above with respect to the improved pivot assemblies. Insert strip 104 provides a low-friction sliding surface for pivotal movement of the clutch shoes in addition to the shock-absorbing feature, with metallic pivot pin sector 106 providing the required strength and reinforcement for insert strip 104. The arrangement of FIG. 13, however, does not enable insert strip 104 to be in biaxial compression since the strip is not confined within the V-shaped groove of the metallic pin portion as in the above described constructions. FIG. 13 illustrates that the arcuate length of the outer convex surface and the configuration of the plastic insert strip which is mounted in combination with the metallic pin may vary without affecting the main concepts of the invention; that is, a shock-absorbing, reinforced, low-friction, pivotal bearing member. It is important for the satisfactory operation of pivot assembly 103 that the plastic insert strip and the metallic backup pin portion be joined together in some type of configuration such as the V-shaped arrangement shown above that will prevent the plastic strip from sliding or moving with respect to the backup pin, as would occur if these two elements were joined by single planar mating surfaces.

Fourth Embodiment

Figure 7:
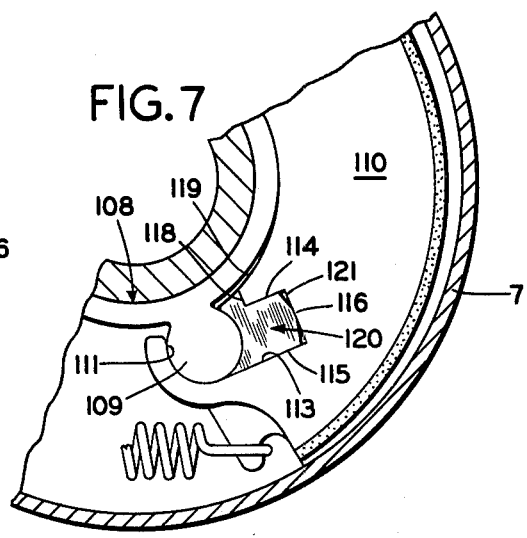
FIG. 7 is an enlarged fragmentary view similar to FIG. 3, portions of which are in section, showing a modified form of the improved pivotal mounting assembly.
Figure 8:
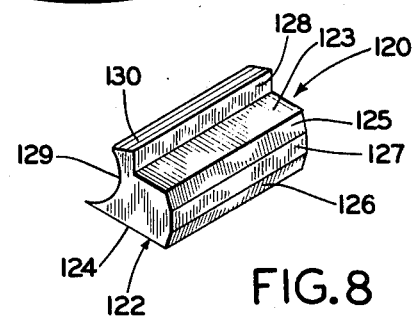
FIG. 8 is a perspective view of the plastic insert strip of the modified pivotal mounting assembly of FIG. 7.
Figure 12:
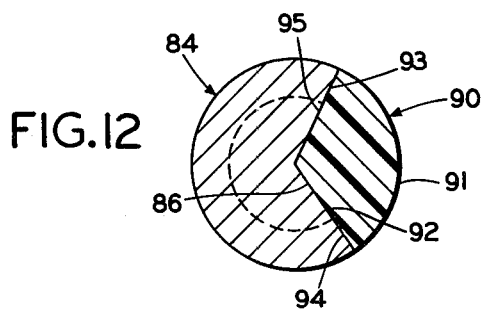
FIG. 12 is a sectional view taken on line 12—12, FIG. 11.

FIGS. 7 and 8 show another modified form of the improved pivotal mounting assembly which achieves the same shock-absorbing and low-friction features discussed above. The modified assembly is incorporated into a clutch construction similar to that of FIGS. 1-6. In this modified assembly, a pivot collar 108, which is similar to pivot collar 21, is formed with a pair of cylindrical-shaped projections 109. Projections 109 are similar to projections 47 except no V-shaped groove is formed therein. Clutch shoes 110, which are similar to clutch shoes 22, are formed with discontinuous openings 111 adjacent one end for telescopically receiving projections 109 therein to pivotally mount the shoes on pivot collar 108.

A generally rectangular-shaped recess 113 is formed in each of the clutch shoes 110 and is defined by a pair of spaced parallel walls 114 and 115 and an end wall 116. Wall 114 terminates in a shoulder 118 which connects with the concavely curved inner edge 119 of clutch shoe 110.

In accordance with the invention, a plastic insert strip 120 formed of the same type of material as insert strips 54, 90 and 104, is seated within recess 113 and preferably secured therein by an adhesive 121. Strip 120 (FIG. 8) has a somewhat irregular configuration with a generally rectangular or cubical-shaped rear mounting portion 122 defined by parallel top and bottom surfaces 123 and 124 which are complementary to recess defining walls 114 and 115, respectively. Surfaces 123 and 124 terminate in a pair of angled rear surfaces 125 and 126 which join with a rear surface 127. Surface 127 abuts against recess rear wall 116 when strip 120 is mounted within recess 113, with angled surfaces 125 and 126 forming voids between the rear of strip 120 and the recess walls for receiving adhesive 121 therein. Surface 123 terminates at its forward edge in an upstanding surface 128.

The main feature of strip 120 is the formation of a concavely shaped, curved front surface 129 which has a radius of curvature complementary to the radius of curvature of pivot collar projection 109. Curved surface 129 is joined at one end to surface 128 by a slightly radiused surface 130 to eliminate a feathered edge. Surface 129 may vary in arcuate length without affecting the concept of the invention, as can convex surfaces 55 and 91 of strips 54 and 90. An arcuate length of approximately 125° has been found to be satisfactory. Strip 120 will have an axial length generally equal to the longitudinal length of projections 109 to provide a broad pivotal bearing surface.

Clutch shoes 110 will pivot outwardly on projections 109 when sufficient centrifugal force is exerted thereon to couplingly engage the clutch housing with concave surface 129 of strip 120 providing the smooth low-friction bearing surface between clutch shoes 110 and pivot pin projections 109. Furthermore, strip 120 will absorb many of the coupling forces and stresses exerted on the pivot assembly in a similar manner as when formed as a part of the pivot pin itself as in the above-described embodiments. The surrounding metal of the clutch shoes in which recess 113 is formed, provides the backup reinforcement for insert 120, a does cylindrical-shaped projection 47, cylindrical body 85 and pin sector 106, described above. This confinement of the plastic insert strip within the surrounding metal of the clutch shoe web will placed strip 120 in biaxial and triaxial compression.

The important aspect and feature of strip 120 is the formation of concaved surface 129 which slidably engages the outer convex surface of the pivot pin or pivot projection. The particular configuration of rear mounting portion 122 of strip 120 may vary appreciably without affecting the concept of the invention. Various configurations of strip mounting portion 122 may be used to achieve various operating characteristics; for example, the length and height of rear portion 122 may be varied to increase the shock-absorbing capabilities of strip 120.

SUMMARY

The improved pivotal mounting assembly and the various embodiments thereof provide a construction especially suitable for pivot connections which are subject to considerable force and stress, such as are encountered in a clutch, upon and during coupling engagement of the pivotal mounted shoes with a clutch housing. Likewise, brake shoes, whether hydraulically or manually actuated, experience large forces and stresses upon engaging a rotating brake drum. These brakes will have improved life and performance characteristics if the improved pivotal mounting assembly is used for pivotally mounting the brake shoes on the backing plate. The improved assembly has the further advantage of being readily incorporated into existing clutch and brake constructions without appreciably modifying the same, since the outer diameter of the pivot pin is not increased. The maintaining of the pivot pin diameter the same as when the entire pin is formed of metal while providing the shock-absorbing and low-friction characteristics, is an extremely important advantage of the improved pivot assembly, not believed possible with known pivotal mounting assemblies. This feature is especially important in many clutch and brake constructions where space is limited and large forces and stresses are exerted on the pivot assembly. The improved pivotal mounting assembly also reduces "fretting" corrosion which occurs in many clutch and brake constructions due to the vibrational chatter which develops as a result of the coupling action. It is understood that the insert strip may be formed of various types of materials similar to the particular plastic material set forth above, which would provide the various degrees of lubrication and shock-absorbing properties desired, including powdered metals, etc.

Accordingly, the improved pivotal mounting assembly provides a construction which is relatively simple in assembly and manufacture, which is effective, safe, inexpensive and efficient, which achieves all the enumerated objectives, eliminates difficulties encountered with prior assemblies, and solves problems and satisfies needs existing in the art.

In the foregoing description, certain terms have been used for brevity, clearness and understanding, but no unncessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved pivotal mounting assembly is constructed, assembled and operated, the characteristics of the new construction, and the advantages, new and useful results obtained; the new and useful structures, devices, elements, arrangements, parts, and combinations are set forth in the appended claims.

I claim:

1. In a centrifugal clutch construction of the type having a driven clutch member, drive shaft means, hub means mounted on the drive shaft means for rotation with said shaft means, clutch shoe means pivotally mounted on the hub means for outward movement under the influence of centrifugal force toward and against the drive clutch member for coupling engagement therewith, and pivot means pivotally mounting the clutch shoe means on the hub means, wherein the improvement includes: said pivot means being a generally cylindrical-shaped projection mounted on the hub means and extending in an axial direction along said hub means; a longitudinally extending groove formed in the cylindrical-shaped projection; and a strip of plastic material mounted in said groove having a low-friction, shock-absorbing arcuate pivotal bearing surface for the clutch shoe means, said plastic strip being complementary to the pivot projection groove and having a radius of curvature substantially equal to the radius of curvature of the cylindrical-shaped projection with said arcuate bearing surface lying in the imaginary circumference defined by said projection.

2. In a centrifugal clutch construction of the type having a driven clutch member, drive shaft means, hub means mounted on the drive shaft means for rotation with said shaft means, clutch shoe means pivotally mounted on the hub means for outward movement under the influence of centrifugal force toward and against the drive clutch member for coupling engagement therewith, and pivot means pivotally mounting the clutch shoe means on the hub means, wherein the improvement includes: said pivot means being generally cylindrical-shaped projections mounted on the hub means and extending in an axial direction along said hub means; a longitudinally extending V-shaped groove formed in each of the cylindrical-shaped projections; a strip of plastic material mounted in each of the grooves providing a low-friction, shock-absorbing arcuate pivotal bearing surface for the clutch shoe means, said plastic strips being complementary to the pivot projection grooves and resembling in cross section a sector of a circle with the arc of the sector forming the arcuate bearing surface; and the bearing surface of each of the plastic strips having an arcuate length less than 180° with a radius of curvature the same as the radius of curvature of the cylindrical-shaped projection, and with said arcuate bearing surface lying in an imaginary circumference defined by said cylindrical-shaped projection.

3. The clutch construction defined in claim 2 in which the hub means includes a cylindrical pivot collar telescopically mounted on the drive shaft means; and in which the pivot means includes a pair of diametrically opposed cylindrical-shaped projections mounted externally on the collar and extending along and parallel with the axis of said collar.

4. The clutch construction defined in claim 3 in which the cylindrical-shaped projections are formed integrally with the cylindrical pivot collar.

5. The clutch construction defined in claim 2 in which the plastic insert is formed of polysulfone.

6. The clutch construction defined in claim 2 in which the outer arcuate length of each of the plastic strips is approximately 120°.

7. In a centrifugal clutch construction of the type having a driven clutch member, drive shaft means, hub means mounted on the drive shaft means for rotation with said shaft means, clutch shoe means pivotally mounted on the hub means for outward movement under the influence of centrifugal force toward and against the driven clutch member for coupling engagement therewith, and pivot pin means pivotally mounting the clutch shoe means on the hub means, wherein the improvement includes: the hub means including a radially extending drive flange; the pin means being mounted on the drive flange and projecting perpendicularly outwardly from the drive flange parallel with the drive shaft means, with said pin means having a generally cylindrical configuration; a V-shaped groove formed in each of the pin means; a strip of plastic material mounted in each of the grooves providing a low-friction, shock-absorbing pivotal bearing surface for the clutch shoe means, said plastic strip being complementary to the pin means grooves and resembling in cross section a sector of a circle with the arc of the sector forming the shock-absorbing pivotal bearing surface; and said arcuate bearing surface of each plastic strip having an arcuate length less than 180° with a radius of curvature the same as the radius of curvature of the cylindrical pin means, and with said strip arcuate bearing surface lying in an imaginary circumference defined by said cylindrical pin means.

8. In a centrifugal clutch construction of the type having a driven clutch member, drive shaft means, hub means mounted on the drive shaft means for rotation with said shaft means, clutch shoe means pivotally mounted on the hub means for outward movement under the influence of centrifugal force toward and against the driven clutch member for coupling engagement therewith, and pivot pin means pivotally mounting the clutch shoe means on the hub means, wherein the improvement includes: the pivot pin means each having a convex curved surface; the clutch shoe means each having a concave surface complementary to the convex surface of the pin means and defining a portion of a pivot pin means receiving opening formed in the clutch shoe means; the pin means being telescopically engaged within the opening of the clutch shoe means, with the concave surface of the clutch shoe means being slidably engaged with the convex surface of the pin means; notch means formed in the concave surface of the clutch shoe means pivot pin mean receiving opening; plastic insert means mounted in the notch means and having a curved concave surface forming a part of the concave surface of the clutch shoe means opening to provide a low-friction, shock-absorbing pivotal connection between the pivot pin means and clutch shoe means, said curved concave surface of the insert means having an arcuate length less than 180°; and the insert means having a generally cubical-shaped rear projection which is seated within the notch means and is complementary in shape and size to said notch means.

9. The clutch construction defined in claim 8 in which the concave curved surface portion of the insert means has an arcuate length of approximately 125°.